(12) United States Patent
Bernard

(10) Patent No.: US 7,069,126 B2
(45) Date of Patent: Jun. 27, 2006

(54) EMISSION MONITORING DISPLAY DEVICE

(76) Inventor: Lee Bernard, 4090 W. Lynwood Dr., Beaumont, TX (US) 77703

( * ) Notice: Subject to any disclaimer, the term of this patent is extended or adjusted under 35 U.S.C. 154(b) by 152 days.

(21) Appl. No.: 10/886,418

(22) Filed: Jul. 7, 2004

(65) Prior Publication Data
US 2006/0009889 A1 Jan. 12, 2006

(51) Int. Cl.
G01M 17/00 (2006.01)
(52) U.S. Cl. ............................ 701/34; 701/36; 340/438
(58) Field of Classification Search ................. 701/1, 701/29, 30, 31, 33, 34, 35, 115; 709/213, 709/217, 218; 715/700; 340/438
See application file for complete search history.

(56) References Cited

U.S. PATENT DOCUMENTS 6,149,062 A * 11/2000 Danielson et al. ..... 235/472.01
6,308,130 B1 * 10/2001 Vojtisek-Lom ............... 701/114
6,435,019 B1 * 8/2002 Vojtisek-Lom .............. 73/118.1
6,445,287 B1 * 9/2002 Schofield et al. ............ 340/442
6,480,103 B1 * 11/2002 McCarthy et al. ......... 340/425.5
6,604,033 B1 * 8/2003 Banet et al. .................... 701/33
6,892,116 B1 * 5/2005 Geisler et al. .................. 701/1
6,968,260 B1 * 11/2005 Okada et al. .................. 701/35

* cited by examiner

Primary Examiner—Richard M. Camby

(57) ABSTRACT

The present invention provides an emission monitoring device for a vehicle. The device comprises a lightweight housing for operationally encapsulating a processor, memory; a sensor for each vehicle component to be monitored, a display device; and a power supply for power the device. The processor is programmed to monitor each sensor, capture data from each sensor, store the captured data from each sensor in the memory; and display the captured onto the display device. In one embodiment of the present invention the housing is operationally mounted onto the inner gas lid of the vehicle. In an alternative embodiment, the housing is incorporated into the dashboard.

16 Claims, 3 Drawing Sheets

EMISSION MONITORING DISPLAY DEVICE

BACKGROUND

This invention relates to devices utilized to monitor air quality in the environment. As the population increases, the use of vehicles will increase thereby creating an increase in air pollution. The Environmental Protection Agency (EPA) has emission guidelines for vehicles that must be met in order for a vehicle to be considered safe. This invention provides a tool to monitor vehicle air emissions, which helps to determine the effect of the vehicle's emissions on air pollution.

SUMMARY

The present invention provides an emission monitoring device for a vehicle. The device comprises a lightweight housing for operationally encapsulating a processor, memory; a sensor for each vehicle component to be monitored, a display device and a power supply for powering the device. The processor is programmed to monitor each sensor, capture data from each sensor, store the captured data from each sensor in the memory; and display the captured onto the display device. In one embodiment of the present invention the housing is operationally mounted onto the inner gas lid of the vehicle. In an alternative embodiment, the housing is incorporated into the dashboard. The device further includes a first hand-held device for a consumer and a second hand-held device for law enforcement officials.

DETAILED SPECIFICATION

Figure 1:
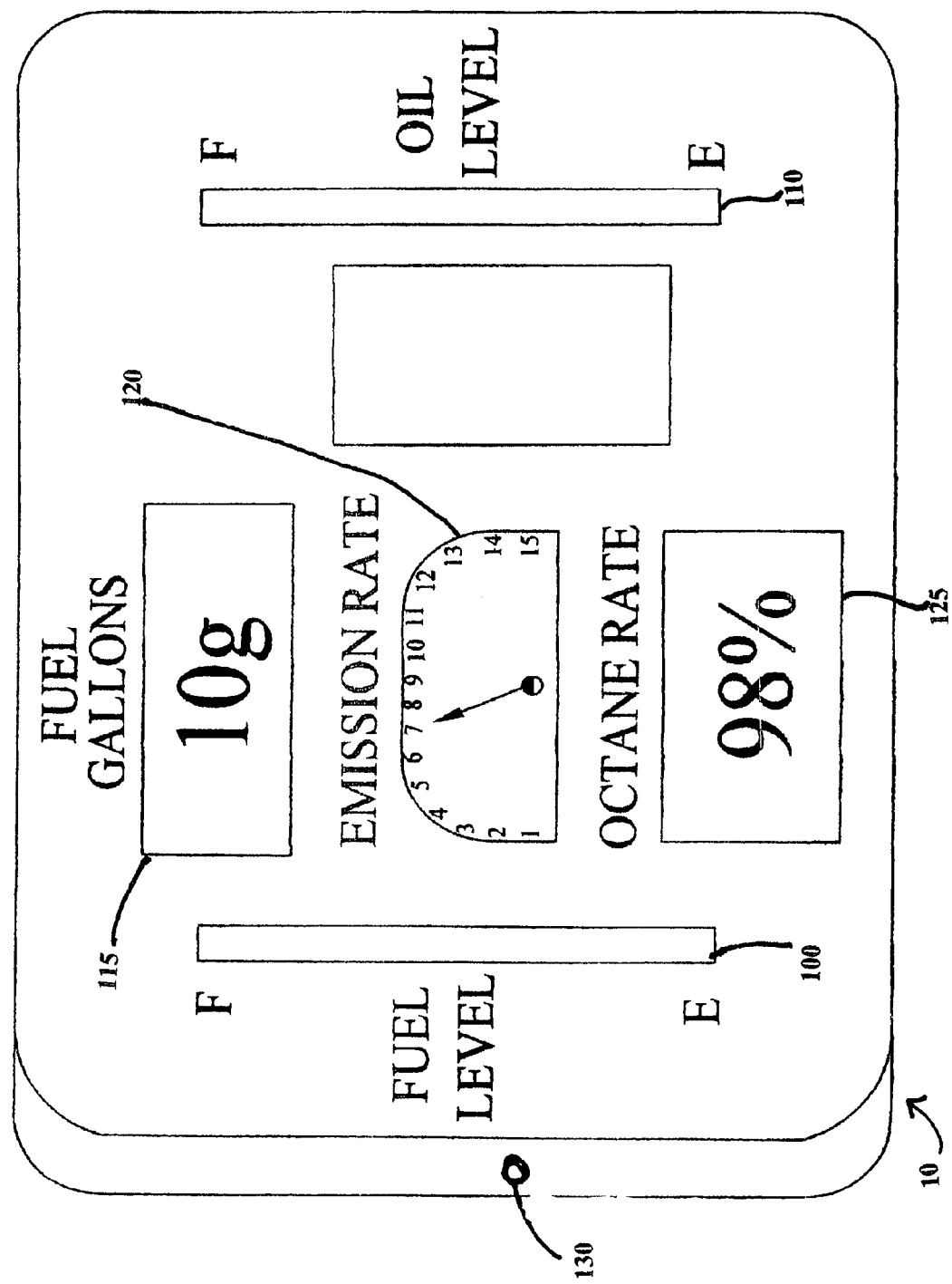
FIG. 1 is a sample display of the present invention.

Referring to FIG. 1, there is shown an illustration of one embodiment of the present invention, an emission monitoring display system (10). As shown, the device can display the following:
Exact fuel level (100)
Exact oil level (110)
Exact number of gallons (115)
Octane rate of gasoline (125)
Exact emission rate (120)
Interface Port (130)

In the preferred embodiment of the present invention, device (10) is dimensioned to be mounted inside the gas lid of the vehicle. In other embodiments, device (10) can be mounted within a vehicle's dashboard. The entire unit is lightweight and weighs between 5–8 ounces.

This embodiment includes an input device for entering data into the system through port (130). The input device can be a touch screen, a voice activated mechanism, and a keyboard input device or another such compatible input device. The display device (10) can be an LCD, an OLED or another such compatible flat or flexible display device.

Figure 1A:
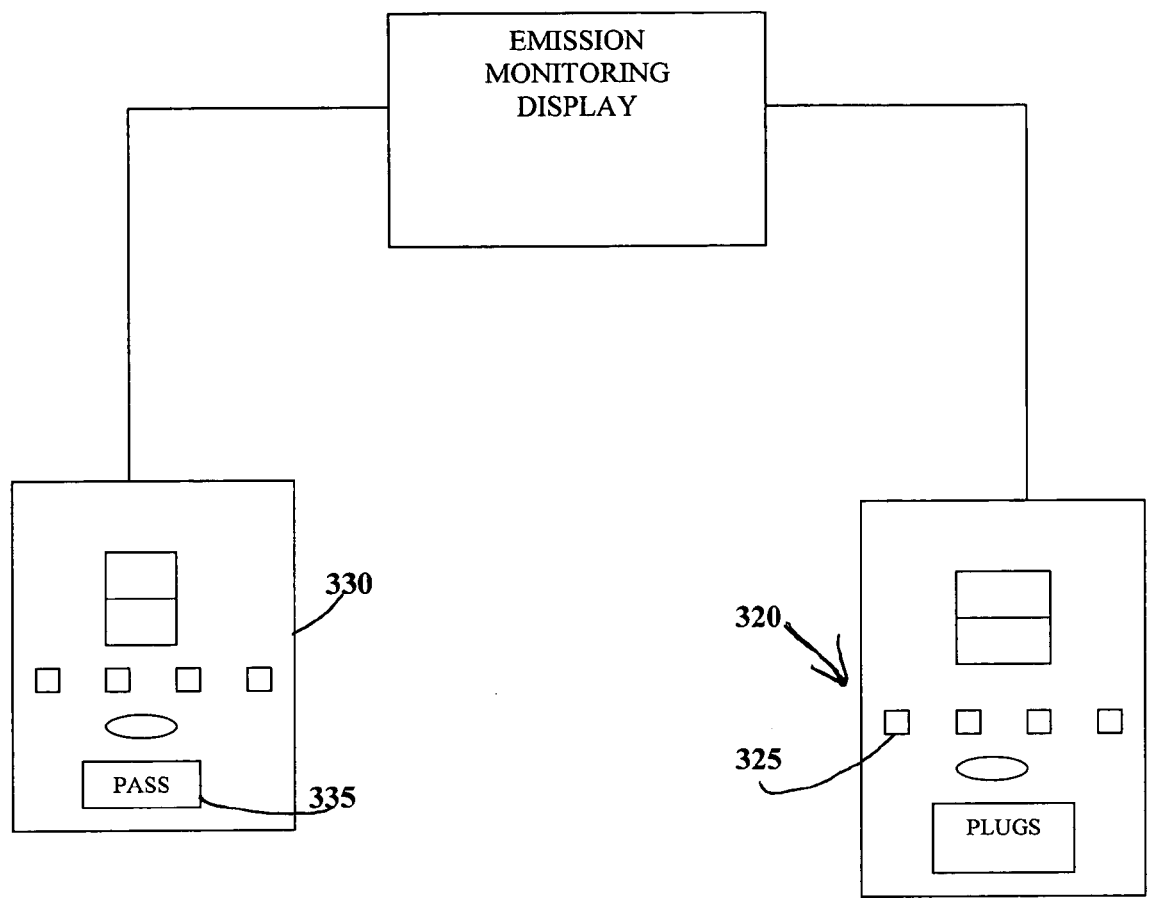
FIG. 1A is illustration of the first and second hand-held devices

As shown in FIG. 1A, the system can include a first hand-held device (320) for the consumer or an automotive repair shop. The first hand-held output device (320) would have a display which indicates the status of several of the sensor leads as described below. For example, if the spark plugs need to be replaced then the device would indicate it through indicator lights (325). In operation, the first hand-held output device (320) would be operationally connected to input port (130) via a hard-wire or a wireless connection.

As shown in FIG. 1A, the system can include a second hand-held device (330) for the law enforcement official. The second hand-held output device (330) would have a display (335) which indicates the status of the emission of the vehicle. For example, the display (335) would indicate pass or fail. Display (335) can be implemented in a color bar or grid. Green can mean pass, yellow can be caution, and red can means fail. In operation, the second hand-held output device (330) would be operationally connected to input port (130) via a hard-wire or a wireless connection.

Figure 2:
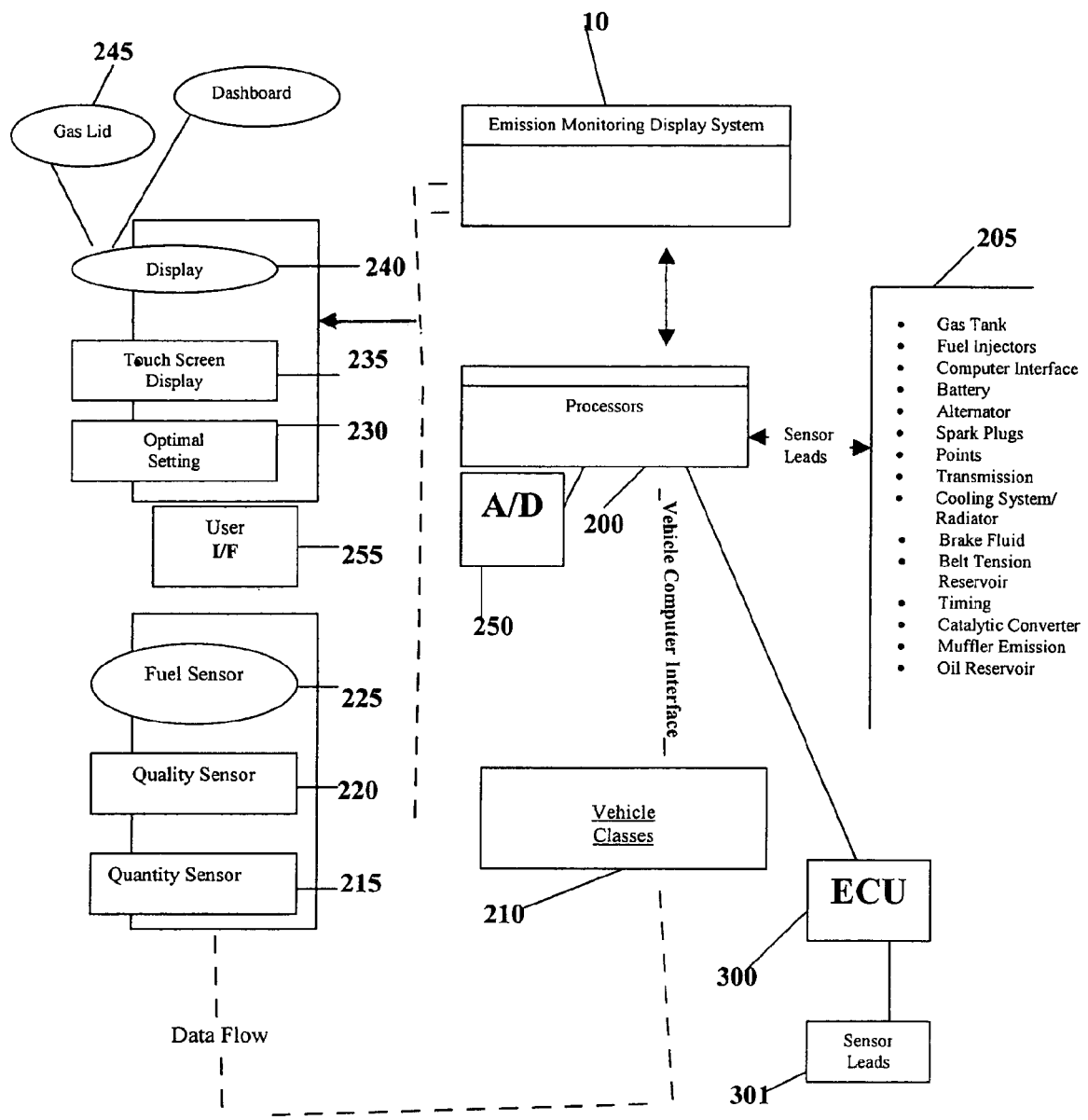
FIG. 2 is an operational diagram of the present invention

Referring to FIG. 2, there is shown an operational block diagram of device (10). The system includes micro-processor (200) connected to a plurality of sensor leads (205). An analog to digital converter (A/D) can be utilized to read analog signals from sensor leads that emit analog signals. The A/D would convert the signals from the sensor leads into digital streams that the microprocessor can read.

The sensor leads can be R/F/A Gallium Sensors or another such compatible sensor lead. In this embodiment, the sensor leads (205) receive information from various vehicle fluid and mechanical components including but not limited to:

| | |
|---|---|
| Oil Reservoir | Points |
| Muffler Emission | Transmission |
| Gas Tank | Cooling System |
| Fuel Injectors | Radiator |
| Computer Interface | Catalytic Converter |
| Battery | Brake Fluid |
| Alternator | Reservoir |
| Spark Plugs | Belt Tension |
| | Timing |

The software program includes vehicle classes (210) which define the data to be stored and the operations to be performed by the software modules that monitor the vehicle fluid and mechanical components. A vehicle object will have to be defined for each type of vehicle to be monitored. The data stored in the objects includes representation of the data received from the sensor leads defined above. The information received includes fuel (225), quality (220) and quantity (215) related sensor data. The sensor leads can report two states (active and dynamic). An active state attributes involve the recording of exposure to negative environments such as wet, dry, heat or vibrations. The dynamic state attributes involve the recording of enhanced performance data.

Additionally, the processor can be interfaced with the existing computer (300) of the vehicle and where applicable provide a check and balance against the data being analyzed by the system of the present invention. The vehicle computer can also be attached to several leads (305) which provide the data which vehicle computer (300).

User interface software (255) is required to allow the user to setup the device to monitor the vehicle and to the control the monitoring process. In some embodiments, the user interface can be adapted to execute through a separate input device connected to port (130). In other embodiments, user interface software (255) can be setup to execute through a touch screen input device which is operationally incorporated into display (240).

In use, the user via an operational setup screen (235) through the User Interface Software (255) defines the control settings to monitor the air quality of the vehicle through the sensor leads, initiating the system to monitor the vehicle. The setup screen (235) can be a touch screen input device. The processor (200) can periodically poll the sensor leads for information and store the data in the vehicle objects (210). Significant event information can be sent to the processor (200) from the sensor leads (205). Additionally, the dynamic state attributes can allow users from the touch tone to initiate the display of real time data. After information has been transmitted to the processor, the received sensor information is stored in memory for display onto the dashboard (246) or on the gas lid (245).

What is claimed is:

1. An emission monitoring device for a vehicle comprising:
   a lightweight housing for operationally encapsulating:
     a processor;
     memory;
     a sensor for each vehicle component to be monitored;
     a display device; and
     a power supply for power the device;
   the processor programmed to:
     monitor the output from each sensor;
     capture data from each sensor;
     store the captured data from each sensor into the memory;
     calculate performance attributes based upon the captured data;
     store the performance attributes; and
     display the performance attributes of each vehicle component onto the display device; and
   the housing being operationally mounted onto the inner gas lid of the vehicle.

2. The device of claim 1 wherein the power supply is a lithium battery.

3. The device of claim 1 wherein the power supply is from the vehicle battery.

4. The device of claim 1 further comprising a communication interface.

5. The device of claim 4 wherein the communication interface is wireless.

6. The device of claim 4 further comprising:
   a first hand-held output device having a processor and a display indicator for each vehicle component to be displayed;
   the processor being programmed to:
     retrieve from memory the performance attributes for each vehicle component to be display; and
     display the performance attribute onto the display indicator, whereby a user can determine the status of the vehicle component from the indicator; and
   the output device being operationally connected to the communication interface.

7. The device of claim 4 further comprising:
   a second hand-held output device having a processor and a display indicator for the vehicle emission; and
   the processor being programmed to:
     retrieve from memory the performance attributes for the vehicle emission; and
     display the performance attribute onto the display indicator, whereby an operator can determine the whether the car pass status of the vehicle component from the indicator; and
   the output device being operationally connected to the communication interface.

8. The device of claim 7 wherein the display indicator displays a red for fail, a green for pass, and a yellow for borderline.

9. The device of claim 4 further comprising a printing device operationally connected to the communication interface.

10. The device of claim 4 further comprising a storage device operationally connected to the communication interface for transferring from memory stored performance attributes and/or captured data for monitored vehicle components.

11. The device of claim 1 further comprising an analog to digital converter for capturing analog data from each sensor producing an analog data.

12. The device of claim 1 further comprising an input device operationally connected to the processor for providing a user interface for initializing each vehicle component to be monitored.

13. The device of claim 1 wherein the vehicle component to be monitored is a detail emission rate for the vehicle.

14. The device of claim 1 wherein the vehicle component to be monitored is the detail fuel level of the vehicle.

15. The device of claim 1 wherein the vehicle component to be monitored is the detail oil level of the vehicle.

16. An emission monitoring device for a vehicle comprising:
   a lightweight housing for operationally encapsulating:
     a processor;
     memory;
     a sensor for each vehicle component to be monitored;
     a display device; and
     a power supply for power the device;
   the processor programmed to:
     monitor the output from each sensor;
     capture data from each sensor;
     store the captured data from each sensor into the memory;
     calculate performance attributes based upon the captured data;
     store the performance attributes; and
     display the performance attributes of each vehicle component onto the display device; and
   the housing being operationally incorporated into the dashboard of the vehicle.

* * * * *